(12) United States Patent
Piirainen et al.

(10) Patent No.: US 10,594,533 B2
(45) Date of Patent: Mar. 17, 2020

(54) DISTRIBUTED BASE STATION WITH FREQUENCY DOMAIN INTERFACE ON WHICH SIGNAL SUBSPACE VARIES ACCORDING TO FREQUENCY BIN

(71) Applicant: Nokia Solutions and Networks Oy, Espoo (FI)

(72) Inventors: Olli Juhani Piirainen, Oulu (FI); Shirish Nagaraj, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/285,518

(22) Filed: Feb. 26, 2019

(65) Prior Publication Data

US 2019/0190756 A1 Jun. 20, 2019

Related U.S. Application Data

(63) Continuation of application No. 15/303,656, filed as application No. PCT/EP2014/057516 on Apr. 14, 2014, now abandoned.

(51) Int. Cl.
| | |
|---|---|
| *H04L 12/58* | (2006.01) |
| *H04L 27/26* | (2006.01) |
| *H04L 25/03* | (2006.01) |
| *H04W 72/04* | (2009.01) |
| *H04W 88/08* | (2009.01) |

(52) U.S. Cl.
CPC ........ *H04L 27/265* (2013.01); *H04L 27/2647* (2013.01); *H04L 2025/03713* (2013.01); *H04W 72/0453* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 2007/0194979 | A1 | 8/2007 | Hiraoka |
| 2010/0309048 | A1 | 12/2010 | Polisetty |
| 2013/0322581 | A1 | 12/2013 | Piirainen et al. |

FOREIGN PATENT DOCUMENTS

| | | |
|---|---|---|
| CN | 1809043 A | 7/2006 |
| CN | 102944757 A | 2/2013 |

OTHER PUBLICATIONS

Matsuoka, Hidehiro et al., "Comparison of pre-FFT and post-FFT processing adaptive arrays for OFDM systems in the presence of co-channel interference", 2003 IEEE, The 14th IEEE 2003 International Symposium on Personal, Indoor and Mobile Radio Communication Proceedings, pp. 1603-1607.
Letter from China Patent Agent dated Jan. 29, 2019, 2 pgs.
Office Action from the Chinese Patent Office dated Jan. 24, 2019, 6 pgs.

*Primary Examiner* — Zewdu A Beyen
(74) *Attorney, Agent, or Firm* — Harrington & Smith

(57) ABSTRACT

A method and apparatus are disclosed for determining a signal subspace in a communications system. A remote apparatus obtains signal streams from antenna elements or signal streams from antenna beams. Based on the obtained signal streams, the apparatus selects a signal subspace for a user, the signal subspace having a dimension M. Based on the selected signal subspace, the apparatus transmits, via an interface to a central apparatus, M streams of post-fast-Fourier-transform data, the interface being capable of transmitting a different subspace for different frequency bins.

19 Claims, 4 Drawing Sheets

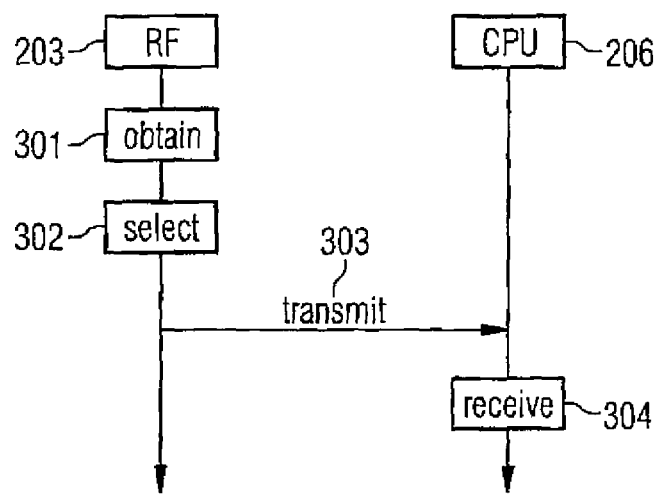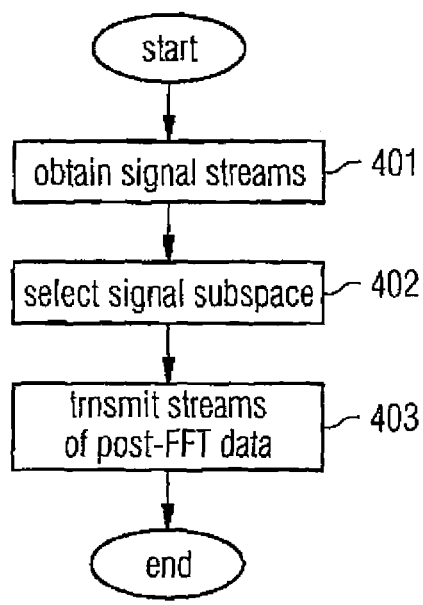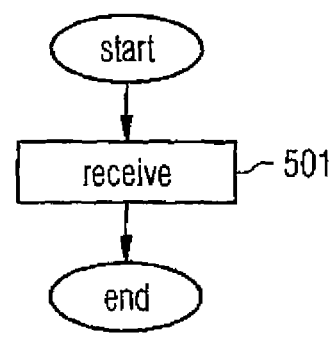

DISTRIBUTED BASE STATION WITH FREQUENCY DOMAIN INTERFACE ON WHICH SIGNAL SUBSPACE VARIES ACCORDING TO FREQUENCY BIN

CROSS-REFERENCE TO RELATED APPLICATIONS

The present application is a continuation of U.S. patent application Ser. No. 15/303,656, filed on Oct. 12, 2016, which is a national stage application under 35 U.S.C. § 371 of PCT/EP2014/057516, filed on Apr. 14, 2014, the disclosures of which are hereby incorporated by reference in their entireties.

FIELD OF THE INVENTION

The exemplary and non-limiting embodiments of this invention relate generally to wireless communications networks, and more particularly to determining a signal subspace.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

In antenna array architectures for an OFDM (orthogonal frequency division multiplexing) system, it is possible for post-FFT (fast Fourier transform) array processing to reduce the complexity of the antenna system by decreasing the number of antennas and the corresponding components, because its performance depends on the number of signal sources. The post-FFT array processing is able to achieve high performance with lower complexity by using subcarrier clustering.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatus, base station, and a computer program product as defined in the independent claims. Further embodiments of the invention are disclosed in the dependent claims.

An aspect of the invention relates to a method for determining a signal subspace in a communications system, the method comprising obtaining, in a remote apparatus, signal streams from antenna elements or signal streams from antenna beams; based on the obtained signal streams, selecting a signal subspace for a user, the signal subspace having a dimension M; and based on the selected signal subspace, transmitting, via an interface to a central apparatus, M streams of post-fast-Fourier-transform data, the interface being capable of transmitting a different subspace for different frequency bins.

A further aspect of the invention relates to an apparatus comprising at least one processor; and at least one memory including a computer program code, wherein the at least one memory and the computer program code are configured to, with the at least one processor, cause the apparatus to obtain signal streams from antenna elements or signal streams from antenna beams; based on the obtained signal streams, select a signal subspace for a user, the signal subspace having a dimension M; and based on the selected signal subspace, transmit, via an interface to a central apparatus, M streams of post-fast-Fourier-transform data, the interface being capable of transmitting a different subspace for different frequency bins.

A still further aspect of the invention relates to a base station comprising the apparatus.

A still further aspect of the invention relates to a computer program product comprising executable code that when executed, causes execution of functions of the method.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which

FIG. 3 illustrates required signalling;

FIG. 4 shows a messaging diagram illustrating an exemplary messaging event according to an embodiment of the invention.

FIG. 5 shows a schematic diagram of a flow chart according to an exemplary embodiment of the invention;

DETAILED DESCRIPTION OF SOME EMBODIMENTS

An exemplary embodiment relates to an interface between an RF module (RRH, AAS etc.) and a system module (baseband processing etc.), especially to a case where a receiver has been equipped with a large number of antennas.

Currently, the interface between the units is carrying I/Q data which is then further processed in the system module. The interface may become an issue when the number of Rx antennas becomes large. For example, the antenna may be an AAS antenna with 24 Rx elements.

When designing the interface, it may be desirable to obtain the most general feature supporting the largest set of features in the future as it is not easy to change the interface. Here three specific constraints are set: channel estimation, CoMP, and user-specific beamforming. Channel estimation may use both RS slots in a subframe (Rel. 10 and UL-MIMO with OCC). CoMP uses an antenna signal from several RRHs. CoMP has a possibility for IRC, Turbo Eq. etc. receiver in the system module. User-specific beamforming utilizes per user optimized spatial processing, and requires channelling each antenna signal to channel estimation.

Other requirements impacting the interface include data rate requirements and latency requirements. The latency requirements originate from timing required for ack/nack reporting (PHICH). Thus, delaying data transfer leads to a higher data rate requirement due to a reduced time for transmission.

Currently, main interface options include CPRI and OBSAI (RP3) interfaces carrying I/Q data from the antennas. Basically, considering an exemplary AAS antenna with 24 Rx elements, the user specific beamforming requires 24 antenna streams to be transmitted to the system module, which is clearly too much. Questions related to interface compression have been emerging.

A post-DFT interface has been proposed as an alternate solution to reduce a sample rate by a ratio of 1200/2048. Each other aspect is similar to the above interface.

Another option is to consider antenna combining in RF and transmit matched filter samples to the system module. The data rates are significantly reduced and each constraint in the previous section is still fulfilled. There is the need to wait for the channel estimate before the antenna combining may be carried out and transmission may start. Thus, the time available for data transfer becomes limited. This creates a connection between DSP processing capabilities (MIPS requirement) and the data rate requirement in the interface. Thus, a potentially large compression but additional constraints for DSP processing requirement may be needed.

Figure 1:
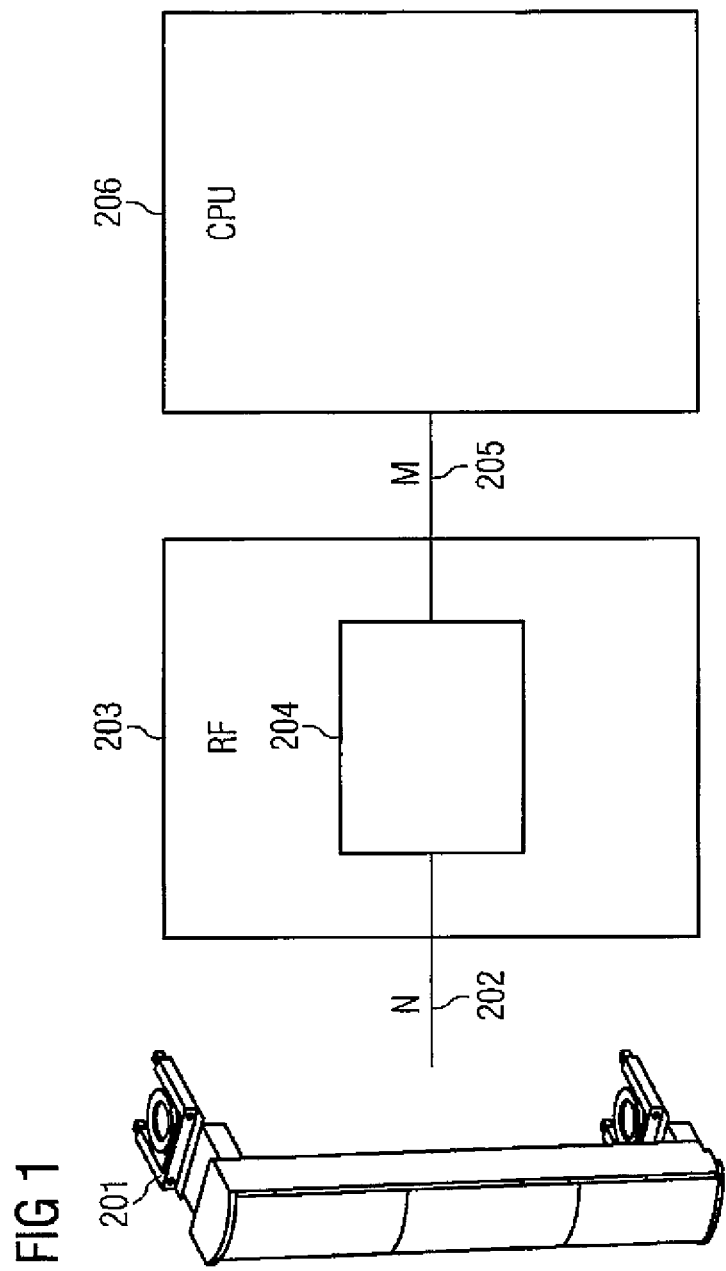
FIG. 1 shows a simplified block diagram illustrating exemplary system architecture.

An exemplary embodiment relates to a signal subspace based post-FFT interface. FIG. 1 shows a simplified block diagram illustrating exemplary system architecture, wherein the signal subspace selection concept is illustrated.

An exemplary embodiment involves a remote unit (RRH, RF) 203 and a central unit (system module, central processing unit) 206 and an interface 205 between them. The remote unit 203 obtains (N) signal streams 202 from antenna elements/beams 201. (N refers to the number of streams obtained from the antenna elements; another option is that N refers to the number of fixed beams created before the processing). Within the remote unit 203 there is a subspace selection/calculation unit 204 which selects a signal subspace for each user (or at least several subspaces in a cell) of a dimension M. The interface 205 transmits M streams of post-FFT data with a capability to transmit a different subspace for different frequency bins (or groups of bins, PRB).

In an exemplary embodiment, a user-specific signal subspace is selected for the user. In an exemplary embodiment, a signal subspace is selected for one or more users. In an exemplary embodiment, several signal subspaces are selected in a cell.

Post-FFT samples and frequency selective signal subspaces are detectable issues in the interface. The (N) streams obtained from the antenna may themselves be the signals from individual antenna elements, groups of elements or separate antenna beams.

There are several methods to determine the subspace for the interface. As an example, two approaches are listed here which both may be implemented with the structure described herein. Firstly, in antenna element/beam selection (MAAS), the best antennas may be selected for the user depending on the fading conditions (for example, such that the subspace selection adapts to fast fading, i.e. the subspace selection adapts to momentary channel state information). Secondly, signal subspace determination may be based on longer term signal properties (for example, the subspace selection may be based on spatial correlation properties of the signal, e.g. the expected direction of the arrived signal).

An advantage includes significantly reduced data rate for the interface. Also, the number of streams in the interface becomes independent on the antenna design by introducing the subspace selection scheme.

Thus, by using post-DFT (discrete Fourier transform) data it is possible to introduce the different subspace/beam for the different frequency bins allowing the same data rate towards the system module regardless of whether the user-specific subspaces have been used or not.

Figure 2:
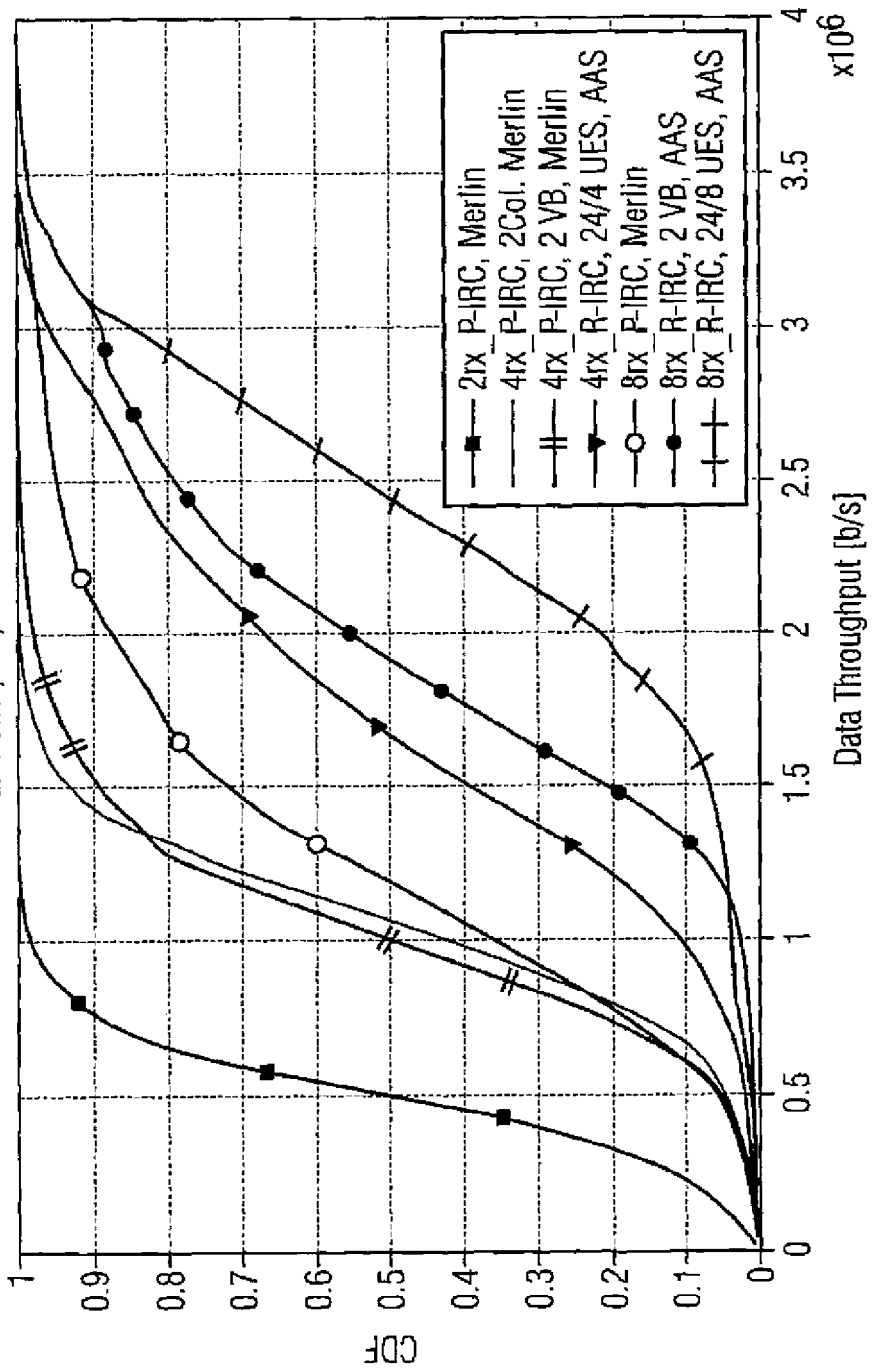
FIG. 2 illustrates simulation results for an AAS antenna with 24 elements.

In FIG. 2, exemplary simulation results are shown. The antenna used in the simulation is an AAS with 24 elements. A long term subspace selection scheme was used to select either 4 or 8 streams for each UE separately, 24/4 UES and 24/8 UES. It was found that the simulated scheme has the best performance over the fixed antenna beam solutions with the same number of streams.

Additionally, in some simulation cases it has been found that the user specific subspace selection may reduce the number of streams required for the system module for the same reference performance.

There may be several possibilities for the subspace selection and the above result is only an example of one scheme in one scenario.

In the following, different embodiments will be described using, as an example of a system architecture whereto the embodiments may be applied, an architecture based on LTE/LTE-A network elements, without restricting the embodiment to such an architecture, however. The embodiments described in these examples are not limited to the LTE/LTE-A radio systems but can also be implemented in other radio systems, such as UMTS (universal mobile telecommunications system), GSM, EDGE, WCDMA, Bluetooth network, WLAN or other fixed, mobile or wireless network. In an embodiment, the presented solution may be applied between elements belonging to different but compatible systems such as LTE and UMTS.

Figure 6:
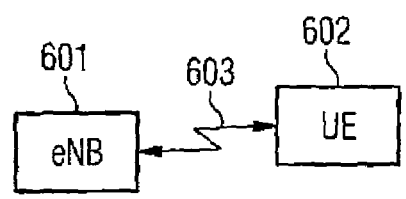
FIG. 6 shows a simplified block diagram illustrating exemplary apparatuses.

A general architecture of a communication system is illustrated in FIG. 6. FIG. 6 is a simplified system architecture only showing some elements and functional entities, all being logical units whose implementation may differ from what is shown. The connections shown in FIG. 6 are logical connections; the actual physical connections may be different. It is apparent to a person skilled in the art that the systems also comprise other functions and structures. It should be appreciated that the functions, structures, elements and the protocols used in or for determining a signal subspace, are irrelevant to the actual invention. Therefore, they need not to be discussed in more detail here.

The exemplary radio system of FIG. 6 comprises a network node 601 of a network operator. The network node 601 may include e.g. an LTE base station of a macro cell (eNB), radio network controller (RNC), or any other network element, or a combination of network elements. The network node 601 may be connected to one or more core network (CN) elements (not shown in FIG. 6) such as a mobile switching centre (MSC), MSC server (MSS), mobility management entity (MME), gateway GPRS support node (GGSN), serving GPRS support node (SGSN), home location register (HLR), home subscriber server (HSS), visitor location register (VLR). In FIG. 6, the radio network node 601 that may also be called eNB (enhanced node-B, evolved node-B) or network apparatus of the radio system, hosts the functions for radio resource management in a public land mobile network.

FIG. 6 shows one or more user equipment 602 located in the service area of the radio network node 601. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smartphone, personal digital assistant (PDA), handset, laptop computer. In the example situation of FIG. 6, the user equipment 602 is capable of connecting to the radio network node 601 via a (cellular radio) connection 603.

Figure 7:
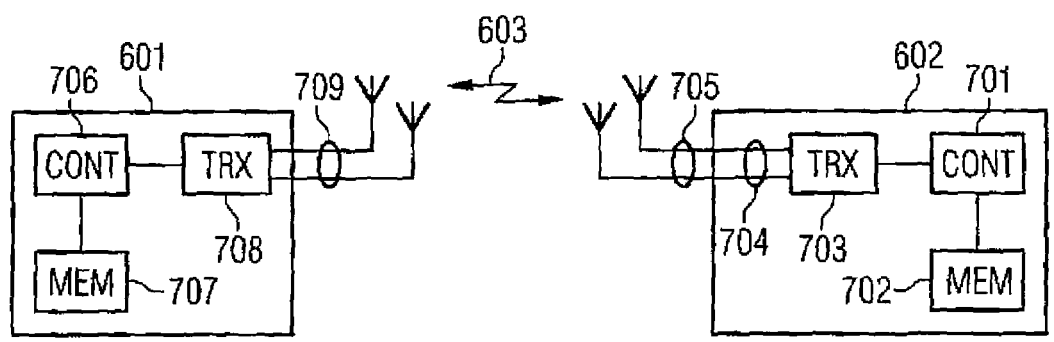
FIG. 7 is a block diagram of an apparatus according to an embodiment of the invention.

FIG. 7 is a block diagram of an apparatus according to an embodiment of the invention. FIG. 7 shows a user equipment 602 located in the area of a radio network node 601. The user equipment 602 is configured to be in connection 603 with the radio network node 601. The user equipment or UE 602 comprises a controller 701 operationally connected to a memory 702 and a transceiver 703. The controller 701 controls the operation of the user equipment 602. The memory 702 is configured to store software and data. The transceiver 703 is configured to set up and maintain a wireless connection 603 to the radio network node 601, respectively. The transceiver 703 is operationally connected to a set of antenna ports 704 connected to an antenna arrangement 705. The antenna arrangement 705 may comprise a set of antennas. The number of antennas may be one to four, for example. The number of antennas is not limited to any particular number. The user equipment 602 may also comprise various other components, such as a user interface, camera, and media player. They are not displayed in the figure due to simplicity.

The radio network node 601, such as an LTE (or LTE-A) base station (eNode-B, eNB) comprises a controller 706 operationally connected to a memory 707, and a transceiver 708. The controller 706 controls the operation of the radio network node 601. The memory 707 is configured to store software and data. The transceiver 708 is configured to set up and maintain a wireless connection to the user equipment 602 within the service area of the radio network node 601. The transceiver 708 is operationally connected to an antenna arrangement 709. The antenna arrangement 709 may comprise a set of antennas. The number of antennas may be two to four, for example. The number of antennas is not limited to any particular number. The radio network node 601 may be operationally connected (directly or indirectly) to another network element of the communication system, such as a further radio network node, radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server, via an interface (not shown in FIG. 7). The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 601, 602 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 601, 602 may generally include a processor, controller, control unit or the like connected to a memory and to various inter-faces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 702, 707 may include volatile and/or non-volatile memory and typically stores content, data, or the like. For example, the memory 702, 707 may store computer program code such as software applications (for example, for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

The signalling chart of FIG. 3 illustrates the required signalling. In the example of FIG. 3, in item 301, an apparatus 203 which may comprise e.g. a remote unit (a remote apparatus e.g. a radio frequency unit and/or a remote radio head unit) implemented in a base station, may, in item 301, obtain signal streams from antenna elements or antenna beams. In item 302, the apparatus may, based on the obtained signal streams, select a signal subspace for a user, the signal subspace having a dimension M. Specifically, the number of the signal streams obtained in item 301 may be different from the (selected) dimension M of the selected signal subspace. In item 303, the apparatus may, based on the selected signal subspace, transmit, via an interface 205 to a central apparatus 206, M streams of post-fast-Fourier-transform data. Thus the interface 205 between the remote unit 203 and the central apparatus 206 is capable of transmitting a different subspace for different frequency bins. The central apparatus 206 may comprise e.g. a central unit (e.g. a central processing unit and/or a system module) implemented in the base station. In item 304, the central unit 206 may receive the M streams of post-fast-Fourier-transform data.

FIG. 4 is a flow chart illustrating an exemplary embodiment. An apparatus 203 which may comprise e.g. a remote unit (a remote apparatus e.g. a radio frequency unit and/or a remote radio head unit) implemented in a base station, may, in item 401, obtain signal streams from antenna elements or antenna beams. In item 402, the apparatus may, based on the obtained signal streams, select a signal subspace for a user, the signal subspace having a dimension M. Specifically, the number of the signal streams obtained in item 401 may be different from the (selected) dimension M of the selected signal subspace. In item 403, the apparatus may, based on the selected signal subspace, transmit, via an interface 205 to a central apparatus 206, M streams of post-fast-Fourier-transform data. Thus the interface 205 between the remote unit 203 and the central apparatus 206 is capable of transmitting a different subspace for different frequency bins. The central apparatus 206 may comprise e.g. a central unit (e.g. a central processing unit and/or a system module) implemented in the base station.

FIG. 5 is a flow chart illustrating an exemplary embodiment. An apparatus 206 which may comprise e.g. a central unit (a central apparatus e.g. a central processing unit and/or a system module) implemented in a base station, may, in item 501, receive M streams of post-fast-Fourier-transform data transmitted, via an interface 205 from an apparatus 203 which may comprise e.g. a remote unit (a remote apparatus e.g. a radio frequency unit and/or a remote radio head unit) implemented in a base station. M represents a dimension of a signal subspace selected in the remote unit 203 for a user.

In an exemplary embodiment, there is a group of frequency bins, and there may be several groups of frequency bins within FFT. Thus, a signal subspace may be frequency bin specific or frequency bin group specific, or the signal subspace may be specific to several groups of frequency bins. Therefore, the interface 205 may be capable of transmitting a frequency bin specific signal subspace to the frequency bin, capable of transmitting a frequency bin group specific signal subspace to the frequency bin group, and/or capable of transmitting a multiple frequency bin group specific signal subspace to the multiple frequency bin groups.

In an exemplary embodiment, post-FFT data refers to data that is divided to individual samples comprising information on each user for which individual subspace definitions may be applied. The users are in a frequency domain, and FFT (or DFT) performs the division.

In an exemplary embodiment, the dimension M is selected according to equipment capabilities and/or interface capabilities.

An exemplary embodiment may be implemented as a computer program comprising instructions for executing a computer process for active antenna array beam calibration. The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

The steps/points, signalling messages and related functions described above in FIGS. 1 to 7 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

PRB physical resource block
RF radio frequency
CPU central processing unit
RRH remote radio head
AAS active antenna system
MAAS multiband active antenna system
I/Q in-phase/quadrature
Rx receiver
DSP digital signal processing
MIPS million of instructions per second
CPRI common public radio interface
OBSAI open base station architecture initiative
RP3 reference point 3
MIMO multiple input multiple output
OCC outgoing call control
CoMP coordinated multipoint transmission
RS reference signal
UL uplink
IRC interference rejection combining
PHICH physical hybrid automatic repeat request indicator channel
ack acknowledgement
nack negative acknowledgement

The invention claimed is:
1. A method, the method comprising
obtaining, in a remote apparatus, a plurality of N signal streams either from a plurality of antenna elements or from a plurality of antenna beams;
based on the obtained N signal streams, determining post-fast-Fourier-transform data comprising data that is divided to individual samples, the individual samples comprising information on each of a plurality of users;
selecting from the post-fast-Fourier transform data a signal sub-space for a selected user of the plurality of users, the signal subspace having a plurality of M streams, where M is different from and less than N; and based on the selected signal subspace, transmitting, via an interface to a central apparatus, the M streams of post-fast-Fourier-transform data that correspond to the selected user.

2. The method according to claim 1, wherein said selecting comprises selecting a signal subspace for multiple selected users.

3. The method according to claim 1, wherein said selecting comprises selecting several signal subspaces in a cell.

4. The method as claimed in claim 1, wherein transmitting further comprises transmitting via the interface different signal subspaces for different groups of frequency bins of the post-fast-Fourier-transform data.

5. The method as claimed in claim 1, wherein the interface is configured to detect post-fast-Fourier-transform samples and frequency selective signal subspaces.

6. The method as claimed in claim 1, wherein the obtained N signal streams comprise signals from individual antenna elements, signals from groups of antenna elements, or signals from separate antenna beams.

7. The method as claimed in claim 1, wherein selecting comprises selecting the subspace corresponding to the antenna element or antenna beam for the selected user based on fading conditions.

8. The method as claimed in claim 1, wherein selecting comprises selecting the signal subspace based on longer term signal properties.

9. An apparatus comprising at least one processor; and at least one memory including a computer program code, wherein the at least one memory and the computer program code are configured to, with the at least one processor, cause the apparatus to
    obtain, in a remote apparatus, a plurality of N signal streams, the N signal streams either from a plurality of antenna elements or from a plurality of antenna beams;
    based on the obtained N signal streams, determine post-fast-Fourier-transform data comprising data that is divided to individual samples, the individual samples comprising information on each of a plurality of users;
    select from the post-fast-Fourier transform data a signal subspace for a selected user of the plurality of users, the signal subspace having a plurality of M streams, where M is different from and less than N; and
    based on the selected signal subspace, transmit, via an interface to a central apparatus, the M streams of the post-fast-Fourier-transform data that correspond to the selected user.

10. The apparatus according to claim 9, wherein said selecting comprises selecting a signal subspace for multiple selected users.

11. The apparatus according to claim 9, wherein said selecting comprises selecting several signal subspaces in a cell.

12. The apparatus as claimed in claim 9, wherein transmitting further comprises transmitting via the interface different signal sub-spaces for different groups of frequency bins of the post-fast-Fourier-transform data.

13. The apparatus as claimed in claim 9, wherein the interface is configured to detect post-fast-Fourier-transform samples and frequency selective signal subspaces.

14. The apparatus as claimed in claim 9, wherein the obtained N signal streams comprise signals from individual antenna elements, signals from groups of antenna elements, or signals from separate antenna beams.

15. The apparatus as claimed in claim 9, wherein the selecting comprises selecting an antenna element or antenna beam for the selected user based on fading conditions.

16. The apparatus as claimed in claim 9, wherein selecting comprises selecting the signal subspace based on longer term signal properties.

17. The apparatus as claimed in claim 9, further comprising a remote radio head unit or a radio frequency unit that performs the obtaining, determining, selecting, and transmitting.

18. A base station comprising the apparatus as claimed in claim 9.

19. A computer program product comprising a non-transitory computer-readable medium comprising executable code that, when executed, causes execution by an apparatus of operations comprising:
    obtaining, in a remote apparatus, a plurality of N signal streams, the N signal streams either from a plurality of antenna elements or from a plurality of antenna beams;
    based on the obtained N signal streams, determining post-fast-Fourier-transform data comprising data that is divided to individual samples, the individual samples comprising information on each of a plurality of users;
    selecting from the post-fast-Fourier transform data a signal sub-space for a selected user of the plurality of users, the signal subspace having a plurality of M streams, where M is different from and less than N; and
    based on the selected signal subspace, transmitting, via an interface to a central apparatus, the M streams of the post-fast-Fourier-transform data that correspond to the selected user.

* * * * *